United States Patent
Shaffer et al.

(10) Patent No.: US 7,402,353 B2
(45) Date of Patent: Jul. 22, 2008

(54) TRANSIENT CONTROLS TO IMPROVE FUEL CELL PERFORMANCE AND STACK DURABILITY

(75) Inventors: Brian D Shaffer, Fairport, NY (US); Abdullah Basar Alp, Rochester, NY (US); Bruce J Clingerman, Palmyra, NY (US)

(73) Assignee: General Motors Corporation, Detroit, MI (US)

( * ) Notice: Subject to any disclaimer, the term of this patent is extended or adjusted under 35 U.S.C. 154(b) by 713 days.

(21) Appl. No.: 10/822,900

(22) Filed: Apr. 13, 2004

(65) Prior Publication Data

US 2005/0227125 A1   Oct. 13, 2005

(51) Int. Cl.
*H01M 8/00* (2006.01)
(52) U.S. Cl. .......................................... 429/13; 429/22
(58) Field of Classification Search .................... 429/12, 429/30, 34, 36, 38, 22, 13
See application file for complete search history.

(56) References Cited

U.S. PATENT DOCUMENTS

2004/0253489 A1* 12/2004 Horgan et al. ................. 429/13
2005/0100777 A1* 5/2005 Gurin et al. .................... 429/38
2006/0035120 A1* 2/2006 Sakai ............................ 429/22

FOREIGN PATENT DOCUMENTS

| DE | 101 55 217 A1 | 5/2003 |
| DE | 102 33 821 A1 | 2/2004 |
| DE | 103 07 856 A1 | 9/2004 |
| JP | 2002352840 A | 6/2002 |
| WO | WO 03/015202 A1 | 2/2003 |

* cited by examiner

*Primary Examiner*—Patrick Ryan
*Assistant Examiner*—Monique Wills

(57) ABSTRACT

The present invention is a method of operating a fuel cell stack and system that minimizes the potential for having a large pressure differential between the anode and cathode flow fields and a low relative humidity occurrence within the cathode flow fields. This is accomplished by tempering the downward transient in power demand seen by the fuel cell stack. The downward transient in power demand on the fuel cell stack is tempered by reducing the rate at which the power generated by the fuel cell stack is decreased and providing the excess power generated by the fuel cell stack to other parasitic components of the fuel cell system.

22 Claims, 2 Drawing Sheets

TRANSIENT CONTROLS TO IMPROVE FUEL CELL PERFORMANCE AND STACK DURABILITY

FIELD OF THE INVENTION

The present invention relates to fuel cells and fuel cell stacks and, more particularly, to methods of controlling the fuel cell stack during downward transients in a power demand placed upon the fuel cell stack.

BACKGROUND OF THE INVENTION

Fuel cells have been proposed as a power source for electric vehicles, stationary power supplies and other applications. One known fuel cell is the PEM (i.e., Proton Exchange Membrane) fuel cell that includes a so-called MEA ("membrane-electrode-assembly") comprising a thin, solid polymer membrane-electrolyte having an anode on one face and a cathode on the opposite face. The MEA is sandwiched between a pair of electrically conductive contact elements which serve as current collectors for the anode and cathode, which may contain appropriate channels and openings therein for distributing the fuel cell's gaseous reactants (i.e., $H_2$ and $O_2$/air) over the surfaces of the respective anode and cathode.

PEM fuel cells comprise a plurality of the MEAs stacked together in electrical series while being separated one from the next by an impermeable, electrically conductive contact element known as a bipolar plate or current collector. In some types of fuel cells each bipolar plate is comprised of two separate plates that are attached together with a fluid passageway therebetween through which a coolant fluid flows to remove heat from both sides of the MEAs. In other types of fuel cells the bipolar plates include both single plates and attached together plates which are arranged in a repeating pattern with at least one surface of each MEA being cooled by a coolant fluid flowing through the two plate bipolar plates.

The fuel cell stacks are typically part of a fuel cell system that is operated to meet a power demand placed upon the fuel cell system. The power demand placed upon the fuel cell system, however, can vary over time for a variety of reasons. For example, when the fuel cell system is on a mobile platform, such as a vehicle, the power demand placed upon the fuel cell system will vary with the desired acceleration and deceleration of the mobile platform. When the fuel cell system is used in a stationary application, the power demand placed upon the fuel cell system will also vary. For example, when a furnace, refrigerator, electric dryer, etc. are switched on and off, the power demand placed upon the fuel cell system will change. In response to the change in the power demand placed upon the fuel cell system, the quantity of anode reactant supplied to the fuel cell stack is typically adjusted to meet the power output demanded of the fuel cell stack. When the power demand placed upon the fuel cell system is decreased (downward transient) the quantity of anode reactant supplied to the fuel cell stack is reduced so that the power output of the fuel cell stack decreases to approximately match the power demand placed on the fuel cell system.

During fast downward transients, however, the current flow through the fuel cell stack decreases much more rapidly than the fuel cell stack can compensate for. For example, if the system is run at a high load at a steady state, the anode and cathode pressures are high, and the operating temperature is at its upper operating range. During a downward transient, the load placed upon the fuel cell system and fuel cell stack goes down very quickly. Ideally, the cathode flow and anode flow should ramp down as quickly, as well as system pressure and coolant temperature. These different parameters, however, have much different physical time constraints. Thus, the load can drop almost instantaneously while the anode and cathode flows may take several seconds and the coolant may take significantly longer to drop to the new operating condition.

This delay in adjusting these different parameters to the new decreased power demand placed upon the fuel cell stack can potentially cause damage to the individual fuel cells and/or fuel cell stack potentially resulting in instantaneous failure of the fuel cell stack and/or a decreased longevity of the fuel cell stack. Thus, it would be advantageous to operate the fuel cell system in a manner that prevents or minimizes the potential for damage to the fuel cells and/or fuel cell stack during downward transients in the power demand placed upon the fuel cell system.

SUMMARY OF THE INVENTION

The inventors have discovered that during the above-described downward transients, two important conditions occur that can damage and/or decrease the longevity of the fuel cell stack. Specifically, the pressure differential between the anode and cathode flow fields can experience a spike and the relative humidity of the membrane within the fuel cells can drop to a level that causes the membranes become drier.

The spike in the pressure differential is caused by the sudden decrease in the load placed upon the fuel cell stack. When the load abruptly drops, the amount of hydrogen within the anode flow fields being consumed also abruptly drops. This is due to the hydrogen flowing from the anode to the cathode side through the membrane and electric load. Thus, the sudden decrease in current flow through the fuel cell stack is equivalent to instantaneously shutting or reducing an anode outlet flow. Additionally, the hydrogen flow controller may take up to a second to actually shut down the hydrogen flow, and the hydrogen in the anode flow has inertia. The combination of the hydrogen outlet being quickly shut down and the hydrogen inlet flow taking a longer time to shut down causes a spike or increase in the anode pressure on the anode side of the fuel cells. On the cathode side, the cathode flow continues unabated while also experiencing a decrease or cessation in the amount of hydrogen flowing from the anode side to the cathode side through the membrane and electric load. The decrease in the quantity of hydrogen flowing to the cathode side causes a decrease in the pressure on the cathode sides of the fuel cells. Thus, the quick downward transient in the power demand placed on the fuel cell stack causes a spike in the anode pressure and a decrease in the cathode pressure yielding a pressure differential that, depending upon the magnitude, may be detrimental to the fuel cells and fuel cell stack.

The drop in the relative humidity during the fast downward transient in the power demand placed on the fuel cell stack and fuel cell system is a result of at least three different occurrences. The first is that when the reaction of consuming hydrogen and oxygen within the fuel cell stack stops due to the rapid decrease in the current generated by the stack, the rate at which water is being produced in the cathode flow fields decreases. Thus, there is less water being formed and available for humidifying the cathode gas. The second occurrence is the drop in the pressure in the cathode flow fields. When the pressure drops, the cathode gas can hold more water vapor. Thus, the sudden pressure drop in the cathode flow fields results in a decrease in the relative humidity because the moisture holding capacity of the cathode gas has increased while the amount of water vapor has maintained the same or decreased. The third occurrence is the slow reduction in temperature. When the fuel cell stack and fuel cell system are operated at high loads, the temperature at which they operate is also high or toward the high end of the operating range. When the power demand on the fuel cell stack and system decreases, the heat generated within the fuel cell stack decreases and the temperature of the stack decreases as a result of the coolant flowing through the fuel cell stack. The decrease in temperature of the cathode gas reduces the amount of water vapor the gas can hold and, thus, helps increase the relative humidity within the stack. The temperature response, however, is a significantly slower response than the other changes in the stack as a result of the downward transient in power demand on the fuel cell stack and system. Thus, while the decreasing temperature helps minimize the reduction of relative humidity, the slow response results in a time period wherein the two other occurrences dominate and the relative humidity within the stack drops to a level that can potentially cause damage to the membrane and reduce the useful life of the fuel cell stack. Thus, the less water production, the decrease in cathode pressure, and the higher cathode temperature (until it is cooled) results in an occurrence of low relative humidity that is potentially detrimental to the fuel cell stack.

The present invention provides a method of operating a fuel cell stack and system that minimizes the potential for having a large pressure differential between the anode and cathode flow fields and a low relative humidity occurrence within the cathode flow fields. This is accomplished by tempering the downward transient in power demand seen by the fuel cell stack. The downward transient in power demand on the fuel cell stack is tempered by reducing the rate at which the power generated by the fuel cell stack is decreased and providing the excess power generated by the fuel cell stack to parasitic components of the fuel cell system.

In accordance with the present invention, a method of operating a fuel cell system having a fuel cell stack operable to produce an electric current is disclosed. The method includes: (1) producing a power output with the fuel cell stack to meet a power demand placed on the fuel cell system; (2) detecting a decrease in the power demand; (3) routing an excess power output of the fuel cell stack to a component of the fuel cell system; and (4) reducing the power output of the fuel cell stack to meet the decreased power demand placed on the fuel cell system.

In another aspect according to the principles of the present invention, a method of managing a pressure differential between anode and cathode flow fields in a fuel cell stack of a fuel cell system during a downward transient in a power demand placed on the fuel cell system is disclosed. The method includes: (1) detecting a decrease in the power demand; (2) routing an excess power output of the fuel cell stack to a component of the fuel cell system; and (3) gradually reducing a power output of the fuel cell stack to meet the decreased power demand placed on the fuel cell system while maintaining a pressure differential between the anode and cathode flow fields below a predetermined value.

In yet another aspect according to the principles of the present invention, a method of maintaining a relative humidity in a fuel cell stack of a fuel cell system between a predetermined range during a downward transient in a power demand placed on the fuel cell system is disclosed. The method includes: (1) detecting a decrease in the power demand; (2) routing an excess power output of the fuel cell stack to a component of the fuel cell system; and (3) gradually reducing a power output of the fuel cell stack to meet the decreased power demand placed on the fuel cell system while maintaining a relative humidity in the fuel cell stack between the predetermined range.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
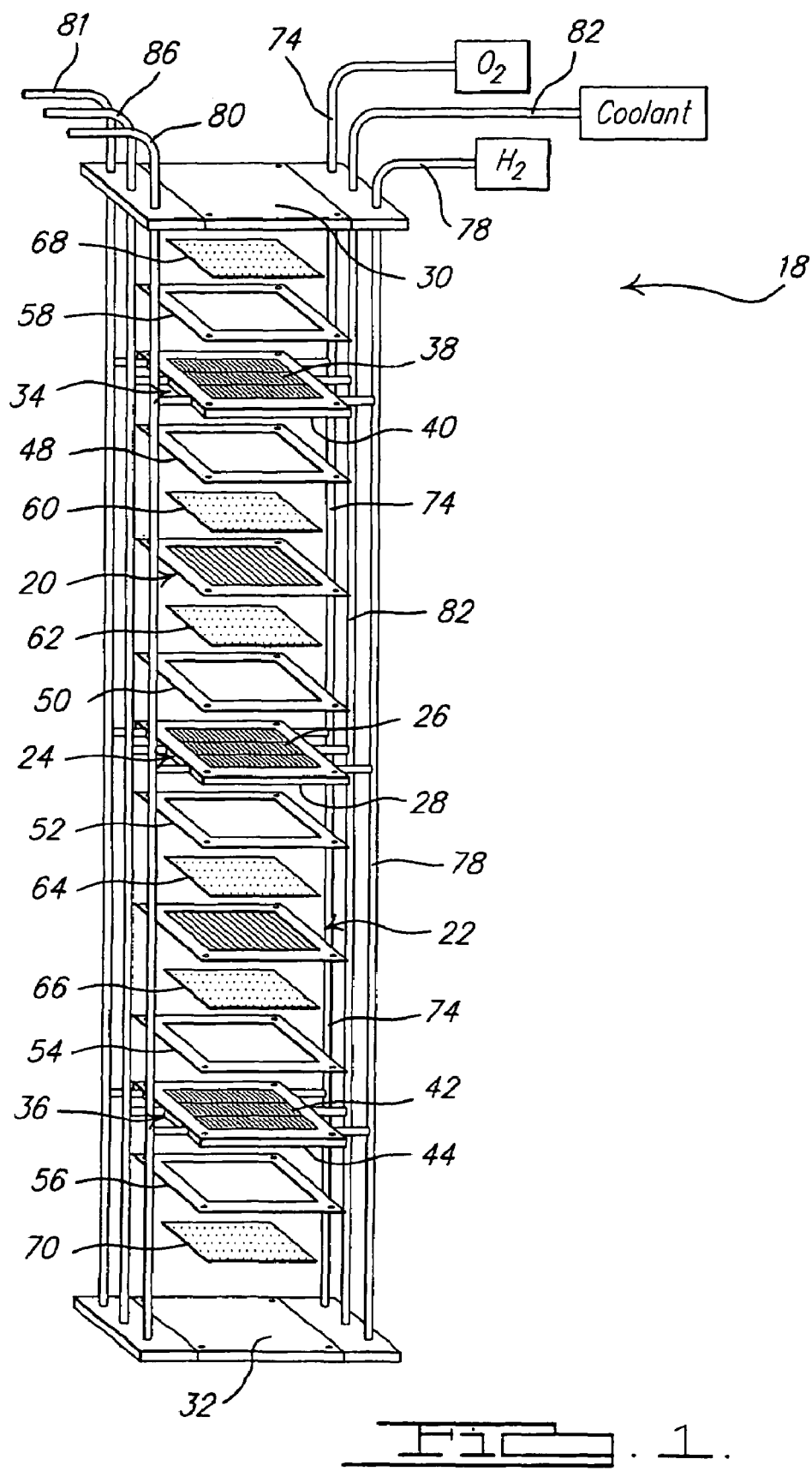
FIG. 1 is a schematic, exploded, isometric, illustration of a liquid-cooled PEM fuel cell stack (only two cells shown)
Figure 2:
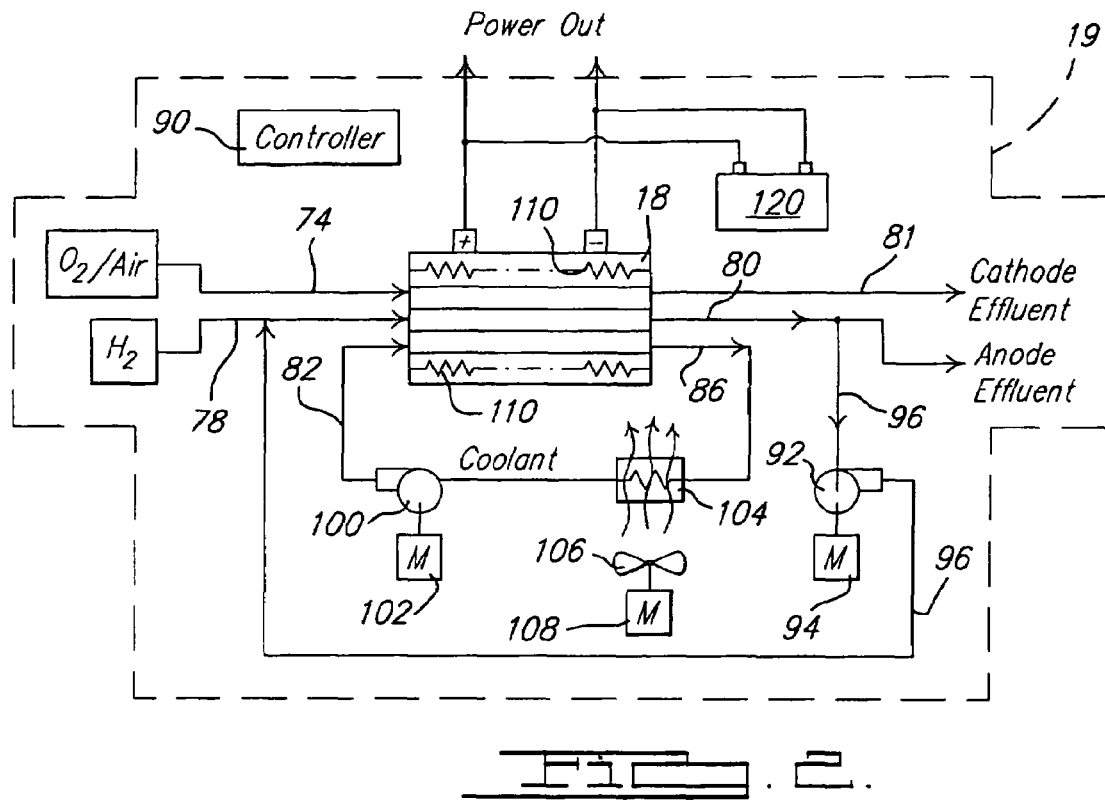
FIG. 2 is a schematic illustration of a fuel cell system having a fuel cell stack, such as that shown in FIG. 1.

To gain a better understanding of the present invention, an exemplary fuel cell stack 18 and fuel cell system 19 where the present invention may be employed are shown in FIGS. 1 and 2. FIG. 1 depicts two individual proton exchange membrane (PEM) fuel cells connected to form a stack 18 having a pair of membrane-electrode-assemblies (MEAs) 20, 22 separated from each other by an electrically conductive, liquid-cooled, bipolar separator plate conductive element 24. An individual fuel cell, which is not connected in series within a stack, has a separator plate 24 with a single electrically active side. In a stack, a preferred bipolar separator plate 24 typically has two electrically active sides 26, 28 within the stack, each active side 26, 28 respectively facing a separate MEA 20, 22 with opposite charges that are separated, hence the so-called "bipolar" plate.

The MEAs 20, 22 and bipolar plate 24 are stacked together between stainless steel clamping terminal plates 30, 32 and end contact fluid distribution elements 34, 36. The end fluid distribution elements 34, 36, as well as both working faces or sides 26, 28 of the bipolar plate 24, contain a plurality of lands adjacent to grooves or channels on the active faces 38, 40, 26, 28, 42, and 44 and form flow fields for distributing anode and cathode reactants (i.e., $H_2$ and $O_2$/air) to the MEAs 20, 22. Nonconductive gaskets or seals 48, 50, 52, 54, 56, and 58 provide seals and electrical insulation between the several components of the fuel cell stack. Gas-permeable conductive diffusion media 60, 62, 64, and 66 press up against the electrode faces of the MEAs 20, 22. Additional layers of conductive media 68, 70 are placed between the end contact fluid distribution elements 34, 36 and the terminal collector plates 30, 32 to provide a conductive pathway therebetween when the stack is compressed during normal operating conditions. The end contact fluid distribution elements 34, 36 press up against the diffusion media 60, 68 and 66, 70 respectively.

Cathode reactant in the form of $O_2$/air is supplied to the cathode flow fields of fuel cell stack 18 from a storage tank or from the ambient via appropriate supply plumbing 74. Similarly, anode reactant in the form of $H_2$ is supplied to the anode flow fields of fuel cell stack 18 from a storage tank, a methanol or gasoline reformer, or the like, via appropriate supply plumbing 78. Exhaust plumbing 80, 81 for the anode and cathode effluents produced in the respective anode and cathode flow fields of fuel cell stack 18 are also provided. Additional supply plumbing 82 is provided for circulating coolant through bipolar plates 24 and end plates 34, 36 and out via exit plumbing 86.

Referring now to FIG. 2, a typical fuel cell system 19 in which the present invention can be utilized is illustrated. Fuel cell system 19 includes a controller 90 that controls the operation of fuel cell stack 18 and the other components of fuel cell system 19. Fuel cell stack 18 is operated to provide a power output that meets a power demand placed on the fuel cell system 19 and the power required to operate the other components of fuel cell system 19.

Some of the other components within fuel cell system 19 include an anode recirculation pump 92 which is driven by an electric motor 94 and is connected between anode effluent plumbing 80 and anode reactant supply plumbing 78 via appropriate plumbing 96. Recirculation pump 92 is operable to cause a portion of anode effluent flowing through anode effluent plumbing 80 to recirculate back into anode reactant supply plumbing 78 to be fed through the anode flow fields of fuel cell stack 18.

The coolant supply system for fuel cell system 19 includes a coolant pump 100 driven by an electric motor 102. The coolant supply system also includes a radiator or heat exchanger 104 through which coolant flows and a fan 106 driven by an electric motor 108 that forces air across radiator 104 to remove heat from the coolant flowing therethrough. Coolant pump 100 and radiator 104 are positioned between coolant supply plumbing 82 and coolant exit plumbing 86 to form a coolant loop through which the coolant flows to remove heat from fuel cell stack 18.

Fuel cell system 19 can also include startup heaters 110 that are located within fuel cell stack 18. Since fuel cell stacks preferably operate at temperatures above ambient temperatures, for example 60° C. and above, it is important to warm the stack 18 as soon as possible after startup. Getting to the stack's normal operating temperature quickly after startup improves the fuel cell system's performance and lengthens the stack's life. Startup heaters 110 are operable to supplement stack waste heat during a cold start. Stack heaters 110 are typically resistive heater elements in the stack end plates 30 and 32, or in the coolant supply plumbing 82. During a cold start, the controller 90 turns on a relay, electrically connecting the heaters 110 in parallel with the stack's power out terminals and the storage device 120. A portion of the stack's current passes through the heaters 110. The additional heat into the stack 18 brings the stack 18 up to its normal operating temperature more quickly than a system that doesn't use startup heaters.

Optionally, fuel cell system 19 can also include an energy storage device 120, such as a battery or capacitors, such as Ultra Caps available from Maxwell Technologies, part number PC2500 (2.5V, 2700 Farads, 625 rated amps). The use of an energy storage device 120 within fuel cell system 19, typically is only done with fuel cell systems 19 that are used in conjunction with a hybrid mobile platform, such as an electrical vehicle. The energy storage device(s) 120 can be charged by plugging the electrical vehicle into a power source, such as a 120-volt power outlet in a garage, and charged for later use in powering the electric vehicle. During operation of the electric vehicle, the energy storage device(s) 120 can also be charged via regenerative braking and the like. When used in conjunction with a fuel cell system 19 instead of an internal combustion engine, fuel cell system 19 can supply excess power to energy storage device 120, as described below. However, it should be understood that in a mobile platform powered entirely by a fuel cell system 19, the presence of significant energy storage devices 120 is unlikely and, thus, will not be available for use in storing significant excess power produced by fuel cell stack 18 and fuel cell system 19.

The present invention is directed to a method of operating fuel cell system 19 during periods of downward transients in the power demand placed upon fuel cell system 19 and fuel cell stack 18. Specifically, the present invention relates to maintaining a pressure differential between the anode and cathode flow fields within fuel cell stack 18 below a predetermined maximum value and the maintaining of the relative humidity within the cathode flow field within a predetermined range. The maximum pressure differential between the anode and cathode flow fields will vary based upon the design of the fuel cell stack 18. Specifically, the type of MEA's and the supporting structures therein will influence the allowable pressure differential that can occur on opposite sides of the MEA without damaging the membranes or decreasing the useful life of the membranes. Similarly, the relative humidity that must be maintained to not dry out the MEA's will also vary depending upon the design of the MEA's.

Figure 3:
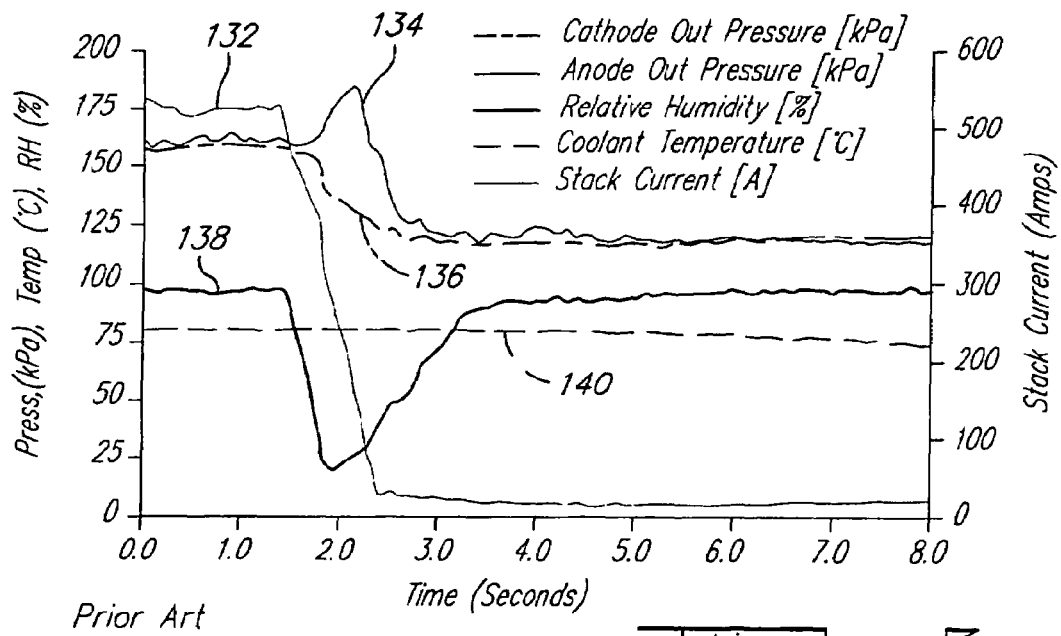
FIG. 3 is a graph showing the response of various parameters of a fuel cell stack during a prior art downward transient in a power demand placed on the fuel cell stack.

Referring now to FIG. 3, a graph of various parameters of fuel cell system 19 and fuel cell stack 18 when being operated by traditional (prior art) operating methods, during a downward transient in a power demand placed on fuel cell system 19 and fuel cell stack 18 is shown. In the graph, the electrical current produced by fuel cell stack 18 is represented by curve 132. The outlet pressures within the respective anode and cathode flow fields are represented by the respective curves 134, 136. The relative humidity within the cathode flow fields of fuel cell stack 18 is represented by curve 138. Finally, the temperature of the coolant exiting the fuel cell stack 18 is represented by curve 140.

As stated above, during a downward transient in a power demand placed on fuel cell system 19 and fuel cell stack 18, the current produced by fuel cell stack 18 will rapidly drop to meet the reduced power demand placed on fuel cell system 19 and fuel cell stack 18. As can be seen in the graph, current curve 132 has a sharp decrease in its level during a typical downward transient. As a result of this rapid downward transient in the current flow produced by fuel cell stack 18, a spike in the pressure differential between the anode and cathode flow fields occurs, as stated above. The spike is clearly seen by the difference in magnitude between anode flow field pressure curve 134 and cathode flow field pressure curve 136 during the time period current curve 132 is rapidly decreasing. As shown, curves 134 and 136 are generally near one another with minor variations therebetween and when the current flow dramatically drops, a spike in the anode flowthrough pressure occurs while the cathode flowfield pressure decreases. The pressure differential subsides after a period of time when the operation of fuel cell stack 18 has stabilized to a new steady state operating condition. This spike in pressure differential, as stated above, is undesirable and can rupture or damage the membranes and decrease the useful life of fuel cell stack 18. Similarly, when the current produced by fuel cell stack 18 rapidly decreases, the relative humidity, as shown in curve 138, also experiences a sudden decrease before returning, after a period of time, to an acceptable level once fuel cell stack 18 has established a new stable operating condition. This sudden drop in the relative humidity within the cathode flow fields can dry out and damage the MEA thereby decreasing the useful life of fuel cell stack 18. The coolant temperature exiting fuel cell stack 18, as seen in curve 140, has a much slower response to the decrease in current produced by fuel cell stack 18.

To avoid the spike in pressure differential between the anode and cathode flow fields and the drop in relative humidity within fuel cell stack 18, the present invention operates fuel cell stack 18 so that the decrease in the power output of fuel cell stack 18 is spread over a longer period of time thereby enabling a smoother transition between the original power demand and the decreased power demand placed upon fuel cell system 19. To accomplish this, fuel cell stack 18 is operated to continue to produce power in excess of that demanded on fuel cell system 19 and directs the excess power to other components of fuel cell system 19. The power generated by fuel cell stack 18 is then gradually reduced in a controlled manner that minimizes and/or prevents a spike in the pressure differential above a predetermined maximum allowable value and maintains the relative humidity within an acceptable operating range.

The excess power produced by the fuel cell stack 18 as its power output is being reduced to meet the reduced power demand placed on fuel cell system 19 is preferably directed first to the operation of coolant pump motor 102. That is, the excess power is preferably routed first to coolant pump motor 102 and, if enough excess power exists, coolant pump motor 102 is operated at its maximum setting. The coolant pump motor 102 then consumes at least a portion of the excess energy produced by fuel cell stack 18 thereby enabling the power output of fuel cell stack 18 to be decreased at a more gradual rate that maintains the operating parameters of fuel cell stack 18 within desirable ranges. In addition, by directing the excess power first to coolant pump motor 102, the increase flow rate of the coolant through fuel cell stack 18 helps to more quickly decrease the temperature in the cathode flow fields thereby decreasing the water holding capacity of the cathode gases and increasing the relative humidity in the cathode reactant flow channels.

Next, it is preferred to route any remaining excess power output of fuel cell stack 18 to radiator fan motor 108. If enough excess power is available, it is preferred that radiator fan motor 108 be operated at its maximum setting. Again, by supplying excess power produced by fuel cell stack 18 to radiator fan motor 108, the power output of fuel cell stack 18 can be reduced at a slower rate and in a controlled manner that prevents the pressure differential exceeding its allowable value and maintains the relative humidity within the desired range. Furthermore, by increasing the speed of radiator fan 106, it helps increase the rate at which heat is extracted from fuel cell stack 18 thereby lowering the temperature in the cathode flow fields more quickly and helping to increase or maintain the relative humidity within the cathode flow fields in the desired range.

Next, if there is still excess power being produced by fuel cell stack 18 that is not consumed by coolant pump motor 102 and radiator fan motor 108, the excess power is preferably directed to end plate heaters 110 in fuel cell stack 18 and/or any other cold start heaters within fuel cell system 19. This option is less desirable because it results in adding more heat back into fuel cell stack 18 which is trying to have its temperature reduced to a new lower operating temperature that corresponds to the desired decrease in power output of fuel cell stack 18. However, the drawbacks of providing the excess power to the startup heaters, is outweighed by the advantages achieved by maintaining the pressure differential below the maximum allowed and maintaining the relative humidity within the desired operating range.

Finally, any remaining excess power can be sent to other parasitic components within fuel cell system 19 that can be tolerated. For example, any remaining excess power can be routed to anode recirculation pump motor 94. However, it should be appreciated that this can cause an increase in the pressure within the anode flow fields and, thus, may not be desirable, depending on the operating conditions and the specific fuel cell stack design. Other examples of parasitic components can include fuel processors, combustors, heaters therein and reactors used with these other components.

Thus, when a fuel system 19 and fuel cell stack 18 are being operated according to the principles of the present invention, a downward transient in a power demand placed on fuel cell system 19 is met by gradually reducing the power output of fuel cell stack 18 and sending excess power produced by fuel cell stack 18 to other components of fuel cell system 19. This enables the reduction of the power output of fuel cell stack 18 to be spread over a longer period of time and enables the operation of the fuel cell stack 18 to avoid spikes in the pressure differential between the anode and cathode flow fields that exceed the predetermined allowed value and maintains the relative humidity within fuel cell stack 18 within a predetermined range. Additionally, the excess power is routed through the other components of fuel cell stack 18 in a hierarchy that helps further reduce the likelihood of damage to fuel cell stack 18 and fuel cell system 19.

It should be appreciated that while the fuel cell system 19 is preferably operated by routing excess power through other components of fuel cell system 19 in an established hierarchy, the sequence or hierarchy can be adjusted based upon a desired operation of fuel cell system 19. Thus, this hierarchy should be viewed as exemplary of the present method and the method is not limited to the hierarchy disclosed herein. Furthermore, it should be appreciated that other components of fuel cell system 19 can be provided with excess power produced by fuel cell stack 18. For example, when fuel cell system 19 includes an energy storage device 120, the excess power produced by fuel cell stack 18 can be routed to energy storage device 120 for subsequent use later on in the electric vehicle within which fuel cell system 19 and energy storage device 120 are located. It should be understood, that energy storage devices 120 are expensive and can add significant weight to fuel cell system 19. Thus, it should be appreciated that an energy storage device 120 may not always be available and, if an energy storage device is available, they may not be designed to receive a significant amount of excess power produced by fuel cell stack 18 such that is helpful in extending the time period within which the power output of fuel cell stack 18 is reduced.

Accordingly, the description of the present invention is merely exemplary in nature and, thus, variations that do not depart from the gist of invention are intended to be within the scope of the invention. Such variations are not to be regarded as a departure from the spirit and scope of the invention.

What is claimed is:

1. A method of operating a fuel cell system having a fuel cell stack operable to produce an electric current, the method comprising:
   (a) producing a power output with the fuel cell stack to meet a first power demand placed on the fuel cell system;
   (b) detecting a decrease in said first power demand placed on the fuel cell system to a lower second power demand;
   (c) routing an excess power output of the fuel cell stack, resulting from a current fuel cell stack output exceeding the second power demand, to a component of the fuel cell system, the component operating with the excess power output at a power level greater than that required to support the second power demand placed on the fuel cell system; and (d) gradually reducing said power output of the fuel cell stack to meet the second power demand placed on the fuel cell system while simultaneously performing (c).

2. The method of claim 1, wherein (c) includes routing at least a portion of said excess power output to a coolant pump motor in the fuel cell system and operating the coolant pump motor at an output level greater than required to support the second power demand placed on the fuel cell system.

3. The method of claim 2, wherein (c) includes operating said coolant pump motor at its maximum output.

4. The method of claim 1, wherein (c) includes routing at least a portion of said excess power output to a radiator fan motor in the fuel cell system and operating the radiator fan motor at an output level greater than required to support the second power demand placed on the fuel cell system.

5. The method of claim 4, wherein (c) includes operating said radiator fan motor at its maximum output.

6. The method of claim 1, wherein (c) includes routing at least a portion of said excess power output to at least one heater in the fuel cell and operating the heater at an output level greater than required to support the second power demand placed on the fuel cell system.

7. The method of claim 1, wherein (d) includes maintaining a pressure differential between an anode and cathode flow in the fuel cell stack below a predetermined value.

8. The method of claim 1, wherein (d) includes maintaining a relative humidity in the fuel cell stack within a predetermined range.

9. The method of claim 8, wherein (d) includes maintaining said relative humidity in the fuel cell stack between about 70 to 100 percent.

10. The method of claim 1, wherein the fuel cell system includes an energy storage device and (c) includes routing said excess power output to said energy storage device.

11. The method of claim 1, wherein (c) includes routing as much excess power output of the fuel cell stack as possible to a coolant pump motor in the fuel cell system, routing as much as possible of any remaining excess power output to a radiator fan motor in the fuel cell system, routing as much as possible of any remaining excess power output to a heater in the fuel cell stack, and routing any remaining excess power output to other components in the fuel cell system.

12. A method of managing a pressure differential between anode and cathode flow fields in a fuel cell stack of a fuel cell system during a downward transient in a power demand placed on the fuel cell system, the method comprising:

(a) detecting a decrease in the power demand to a lower power demand;

(b) gradually reducing a power output of the fuel cell stack to meet the lower power demand laced on the fuel cell system, while maintaining a pressure differential between the anode and cathode flow fields below a predetermined value; and (c) routing an excess power output of the fuel cell stack, resulting from a difference between the power output of the fuel cell stack in (b) and the lower power demand placed on the fuel cell system in (a), to a component of the fuel cell system.

13. The method of claim 12, wherein includes routing at least a portion of said excess power output to a coolant pump motor in the fuel cell system and operating the coolant pump motor at an output level greater than required to support the lower power demand placed on the fuel cell system.

14. The method of claim 12, wherein (c) includes routing at least a portion of said excess power output to a radiator fan motor in the fuel cell system and operating the radiator fan motor at an output level greater than required to support the tower power demand placed on the fuel cell system.

15. The method of claim 12, wherein (c) includes routing at least a portion of said excess power output to at least one heater in the fuel cell system and operating the heater at an output level greater than required to support the lower power demand placed on the fuel cell system.

16. The method of claim 12, wherein (c) includes operating said component of the fuel cell system at its maximum setting.

17. The method of claim 12, wherein the fuel cell system includes an energy storage device and (c) includes routing said excess power output to said energy storage device.

18. The method of claim 12, wherein (b) and (c) are performed substantially concurrently.

19. The method of claim 12, wherein (c) includes routing as much excess power output of the fuel cell stack as possible to a coolant pump motor in the fuel cell system, routing as much as possible of any remaining excess power output to a radiator fan motor in the fuel cell system, routing as much as possible of any remaining excess power output to a heater in the fuel cell stack, and routing any remaining excess power output to other components in the fuel cell system.

20. A method of operating a fuel cell system having a fuel cell stack operable to produce an electric current, the method comprising:

(a) producing a power output with the fuel cell stack to meet a first power demand placed on the fuel cell system;

(b) operating at least one component of the fuel cell system at a first power consumption level corresponding to the first power demand placed on the fuel cell system;

(c) detecting a decrease to a second power demand placed on the fuel cell system, the second power demand corresponding to a second power consumption level of the at least one component of the fuel cell system;

(d) maintaining the power output of the fuel cell stack at a level to meet a power demand greater than the second power demand placed on the fuel cell system, resulting in an excess power output by the fuel cell stack;

(e) routing the excess power output of the fuel cell stack to the component of the fuel cell system;

(f) gradually reducing the power output of the fuel cell stack to the second power demand placed on the fuel cell system; and (g) operating the at least one component at a power consumption level which is greater than the second power consumption level to consume the excess power output of the fuel cell stack.

21. The method of claim 20, wherein (e) includes routing at least a portion of the excess power output to a coolant pump motor in the fuel cell system.

22. The method of claim 21, wherein (g) includes operating the coolant pump motor at its maximum output.

* * * * *